US012779722B2

(12) United States Patent
Cheng

(10) Patent No.: US 12,779,722 B2
(45) Date of Patent: Nov. 3, 2026

(54) TOOL FOR ROLLER SHADE CUTTER

(71) Applicant: Li-Ming Cheng, Kaohsiung City (TW)

(72) Inventor: Li-Ming Cheng, Kaohsiung City (TW)

( * ) Notice: Subject to any disclaimer, the term of this patent is extended or adjusted under 35 U.S.C. 154(b) by 43 days.

(21) Appl. No.: 19/082,252

(22) Filed: Mar. 18, 2025

(65) Prior Publication Data

US 2026/0284917 A1 Sep. 24, 2026

(51) Int. Cl.
*B26D 3/16* (2006.01)
*B26D 7/01* (2006.01)

(52) U.S. Cl.
CPC .......... *B26D 3/16* (2013.01); *B26D 2007/013* (2013.01); *B26D 2210/11* (2013.01)

(58) Field of Classification Search
CPC .......... B26D 3/16; B26D 3/169; B26D 3/166; B26D 33/02; D06H 7/00; B23D 2023/005
See application file for complete search history.

(56) References Cited

U.S. PATENT DOCUMENTS 2,888,048 A * 5/1959 Gast, Jr. .................... D06H 7/18 227/63
3,911,768 A * 10/1975 Kawano .............. B23B 31/1175 82/86

* cited by examiner

*Primary Examiner* — Liang Dong
(74) *Attorney, Agent, or Firm* — WPAT, PC

(57) ABSTRACT

A roller shade cutter includes a base, an operation member and a blade. The base has first and second surfaces opposite to each other. The base further has a location part. The second surface has a stopper protruding therefrom. The base has a shaft tube and a through hole penetrating through the first and the second surfaces. The operation member has first and second ends opposite to each other. The first end has a shaft hole for being pivotally fitted on the shaft tube. An accommodation region is provided between the first and the second ends. The accommodation region has an assembly hole and a recess surrounding the assembly hole and facing the second surface of the base. The accommodation region has a notch. The blade is partially accommodated in the accommodation region. A periphery of the blade has a cutting edge partially protruding from the notch.

8 Claims, 7 Drawing Sheets

TOOL FOR ROLLER SHADE CUTTER

BACKGROUND OF THE INVENTION

1. Field of the Invention

The present application relates to a cutting tool and, more particularly, to a roller shade cutter for cutting roller shade and paper tube.

2. Description of the Related Art

Conventional roller shade come in various styles and patterns to meet different customer needs. To accommodate various window widths and customer preferences, manufacturers first produce roller shade of different styles and patterns in a predetermined width in large quantities. The manufacturers then sell these predetermined-width roller shade to retailers. When customers select their preferred roller shade, the retailers cut the predetermined-width roller shade to smaller widths according to customer requirements.

When cutting the roller shade, the roller shade is secured in a rotatable clamp with one end protruding from the end face of the clamp by a predetermined length. A blade fixed on a cutting tool support seat cuts the protruding end of the roller shade to achieve the smaller width required by the customer.

During the cutting process, the roller shade is kept rotating while being driven by the clamp. The blade support seat is controlled by the operator to adjust the feed amount for the blade's cutting edge to cut the roller shade. Therefore, whether the cutting portion of the roller shade appears neat and has a good appearance depends entirely on the operator's experience. Moreover, if not careful, the blade support seat holding the blade may contact the rotating finished roller shade, causing surface friction or scratch damage, resulting in losses for the retailer.

SUMMARY OF THE INVENTION

To solve the above problems, an objective of the present application is to provide a roller shade cutter that can precisely control the blade's feed amount to prevent friction damage to the finished roller shade surface.

It is another objective of the present application is to provide a roller shade cutter where the blade can be adjusted to ensure the roller shade is always cut by a sharp cutting edge.

It is yet another objective of the present application is to provide a roller shade cutter where the operation member can be adjusted according to the operator's needs for convenient operation of the cutting tool.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "engagement", "coupling", "assembly", or similar terms is used to include separation of connected members without destroying the members after connection or inseparable connection of the members after connection. A person having ordinary skill in the art would be able to select according to desired demands in the material or assembly of the members to be connected.

The roller shade cutter of the present application includes a base, an operation member and a blade. The base has a first surface and a second surface opposite to the first surface. The base further has a location part. The second surface has a stopper protruding from the second surface. The base has a shaft tube and a through hole penetrating through the first surface and the second surface. The shaft tube and the through hole are spaced apart by a distance. The through hole is configured for a bolt to pass through. The operation member has a first end and a second end opposite to the first end. The first end has a shaft hole for being pivotally fitted on the shaft tube. An accommodation region is provided between the first end and the second end. An assembly hole is located in the accommodation region. The assembly hole is configured for the bolt to insert through. The accommodation region further has a recess. The recess surrounds the assembly hole and facing the second surface of the base. The accommodation region has a notch. The blade is partially accommodated in the accommodation region. The blade has a central hole configured for the bolt to insert through and engage with a nut. A periphery of the blade has a cutting edge partially protruding from the notch by a protruding distance.

Therefore, in the roller shade cutter of the present application, since the base has the stopper protruding from the second surface, when the upper surface of the operation member abuts against the stopper, it prevents the operation member from advancing further, thereby avoiding contact with and damage to the roller shade.

In an example, the location part is configured to couple with a coupling part of a machine to position the base relative to the machine. Thus, the roller shade cutter of the present application can be fixed to a machine by the base, allowing the operation member to be operated for cutting a roller shade.

In an example, the shaft tube is fitted on a shaft of a machine, and the base is prevented from detaching by a pin. Thus, the roller shade cutter of the present application can be coupled to a shaft of a machine for cutting a roller shade.

In an example, the shaft hole has an opening slot communicating with the shaft hole. An end face of the first end has a counterbore communicating with the opening slot. A bottom of the counterbore has an inner thread. A screw engages with the inner thread to adjust a gap of the opening slot. This enables the operation member to be pivotally mounted on the shaft tube or conveniently removed from the shaft tube.

In an example, the recess has a post protruding from a surface of the recess. The blade has a plurality of positioning holes arranged in a circle around the central hole. Each of the positioning holes has an equal radius from a center of the central hole. One of the positioning holes is configured for the post to extend into. Thus, when the cutting edge of the blade becomes dull, the screw can be loosened to remove the operation member from the shaft tube, and the blade can be removed and rotated by an angle before being reassembled and fixed for continued use, greatly reducing the blade cost.

In an example, the roller shade cutter of the present application may further include an extending rod. One end of the extending rod being a handle. Another end of the extending rod being coupled to the second end of the operation member. This provides a longer lever arm for the operation member, making it more convenient for operators to operate the roller shade cutter.

In an example, the second end of the operation member has a screw hole configured for a screw to engage with. This allows the extending rod to be conveniently coupled to or detached from the second end of the operation member.

In an example, a periphery of the screw hole has a curved slot. A periphery of the extending rod has a bulge extending into the curved slot. This allows the extending rod to rotate relative to the operation member within a limited angle, enabling adjustment of the angle between the extending rod and the operation member for convenient operation of the roller shade cutter.

BRIEF DESCRIPTION OF THE DRAWINGS

The present invention will become more fully understood from the detailed description given hereinafter and the attached drawings which are given by way of illustration only, and thus are not limitative of the present invention, and wherein.

Figure 1:
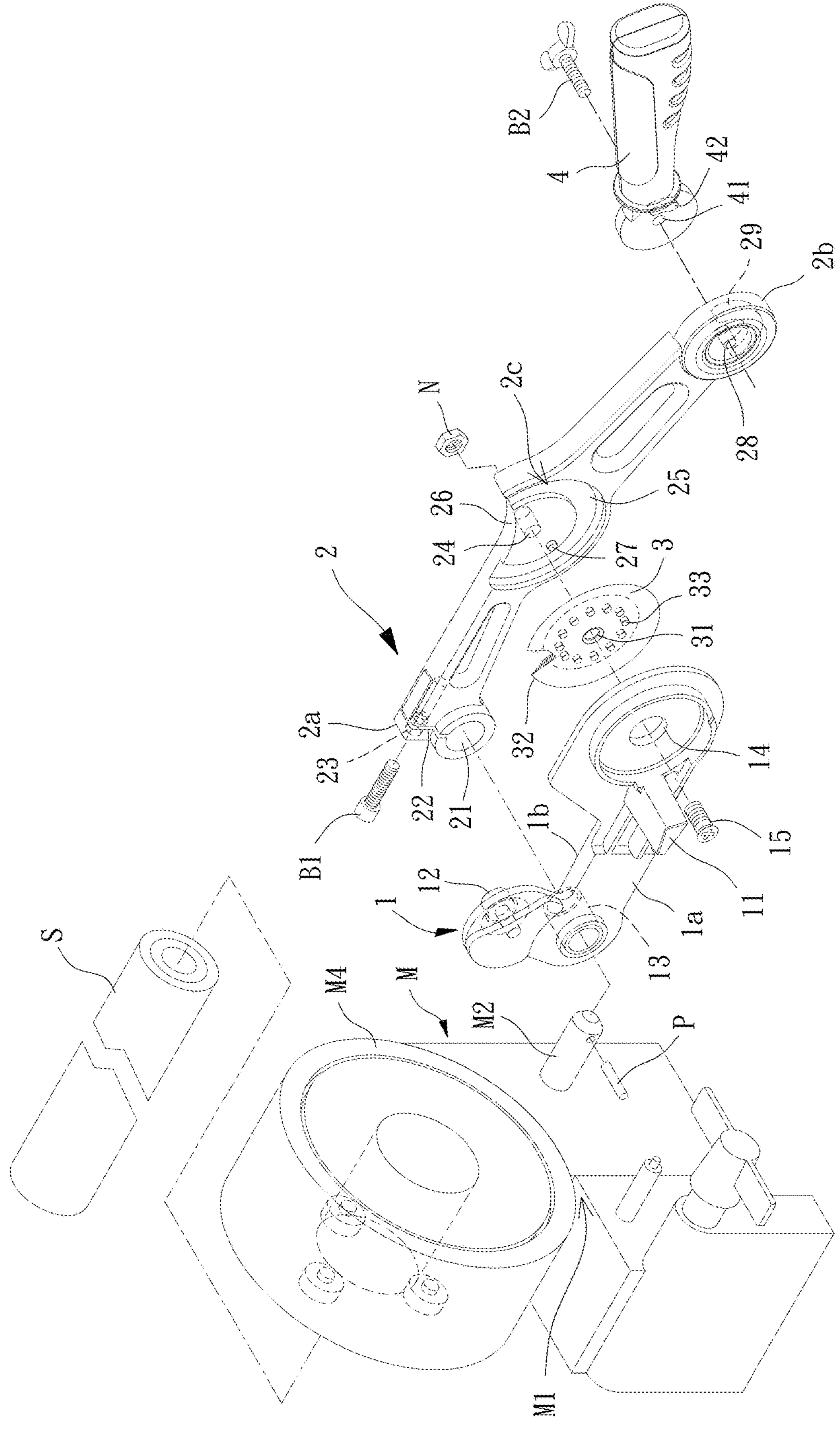
FIG. 1 is an exploded perspective view of a first embodiment of the present application.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

In order to make the above and other objectives, features, and advantages of the present invention clearer and easier to understand, the preferred embodiments of the present invention will be described hereinafter in connection with the attached drawings. Furthermore, the elements designated by the same reference numeral in various figures will be deemed as identical, and the description thereof will be omitted.

Figure 2:
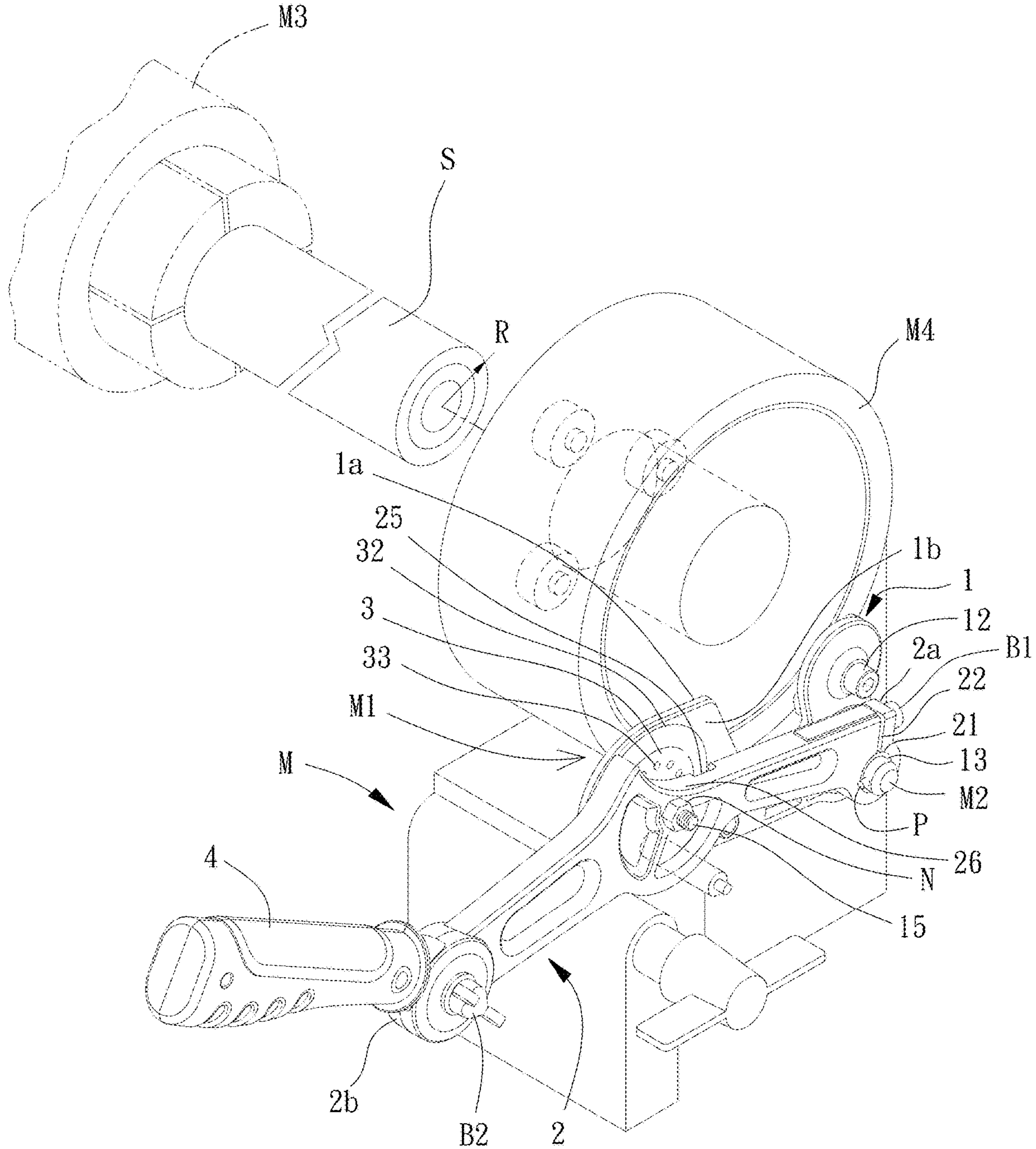
FIG. 2 is an assembled perspective view of the first embodiment of the present application.

Referring to FIGS. 1 and 2, a first embodiment of the roller shade cutter of the present application comprises a base 1, an operation member 2, and a blade 3. The blade 3 can be coupled to the operation member 2, and the operation member 2 can pivot relative to the base 1, allowing the blade 3 to cut a roller shade.

The base 1 has a first surface 1*a* and a second surface 1*b* opposite to each other. The first surface 1*a* can face an end face of a machine M. The base 1 has a location part 11 which, in this embodiment, is a protrusion protruding from the first surface 1*a* and can couple with a coupling part M1 of the machine M. The second surface 1*b* has a stopper 12 protruding from the second surface 1*b*. Preferably, the stopper 12 is a screw that can be conveniently coupled to or removed from the base 1. The base 1 has a shaft tube 13 and a through hole 14 penetrating through the first surface 1*a* and the second surface 1*b*, with the shaft tube 13 and the through hole 14 being spaced apart by a distance. The shaft tube 13 can be fitted on a shaft M2 of the machine M, so that the base 1 (the shaft tube 13) can be prevented from detaching by a pin P. The through hole 14 is configured for a bolt 15 to pass through.

The operation member 2 has a first end 2*a* and a second end 2*b* opposite to each other. The first end 2*a* has a shaft hole 21 for being fitted on the shaft tube 13, allowing the operation member 2 to pivot relative to the base 1 (the shaft tube 13). Preferably, the diameter of the shaft hole 21 can be adjusted so that the operation member 2 can be pivotally mounted on or conveniently removed from the shaft tube 13. In this embodiment, the shaft hole 21 has a communicating opening slot 22, and the end face of the first end 2*a* has a counterbore 23 that communicates with the opening slot 22 and extends into the operation member 2 by a distance. The bottom of the counterbore 23 has an inner thread for a screw B1 to engage with, allowing adjustment of the gap of the opening slot 22 and thus the diameter of the shaft hole 21, enabling the operation member 2 to be pivotally mounted on or conveniently removed from the shaft tube 13. The operation member 2 has an accommodation region 2*c* between the first end 2*a* and the second end 2*b*, with an assembly hole 24 located in the accommodation region 2*c* for the bolt 15 to insert through. The operation member 2 further has a recess 25 in the accommodation region 2*c* surrounding the assembly hole 24 and facing the second surface 1*b* of the base 1. The accommodation region 2*c* has a notch 26. Preferably, the accommodation region 2*c* has a post 27 protruding from a surface of the accommodation region 2*c*.

Figure 3:
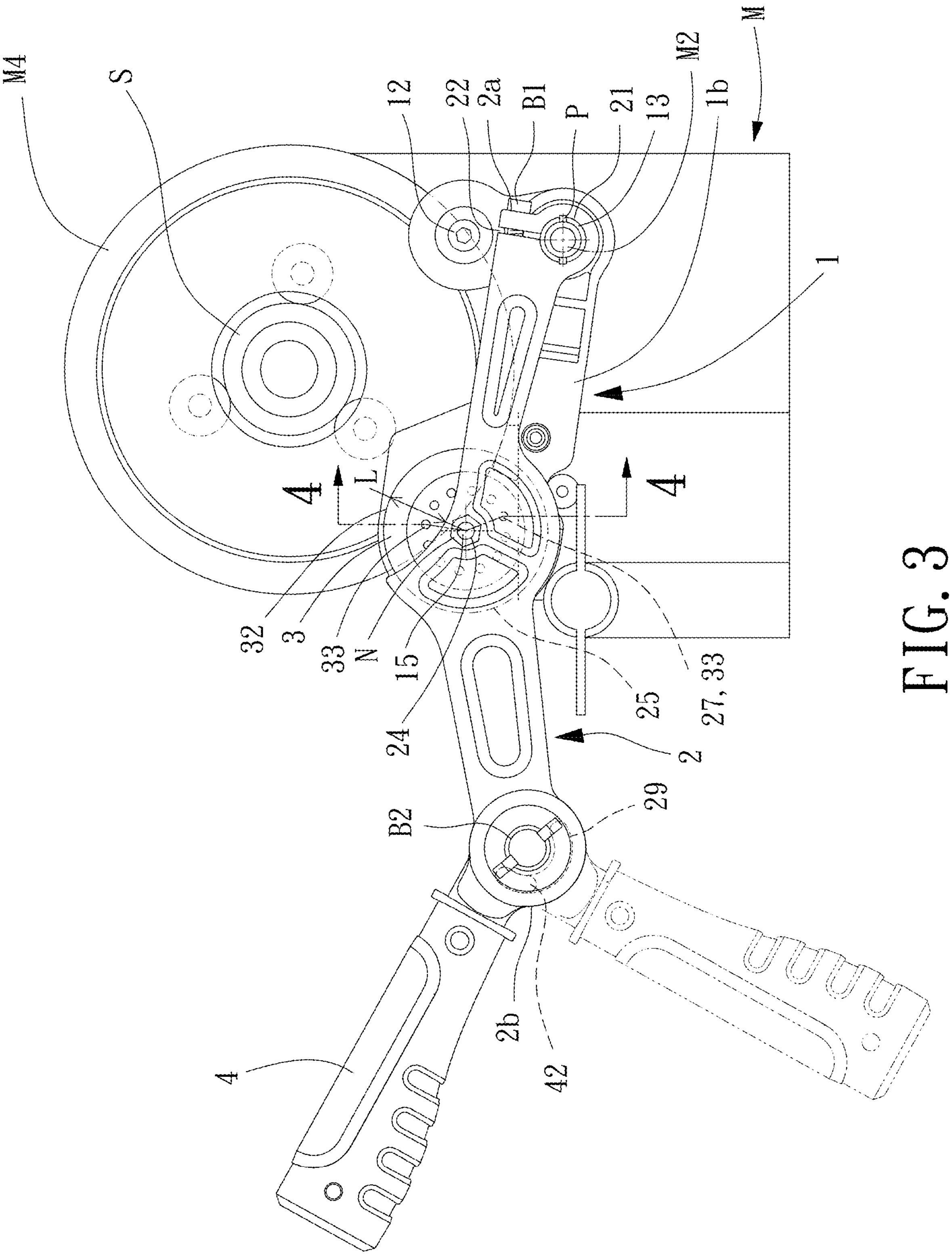
FIG. 3 is a front view of the first embodiment of the present application.
Figure 4:
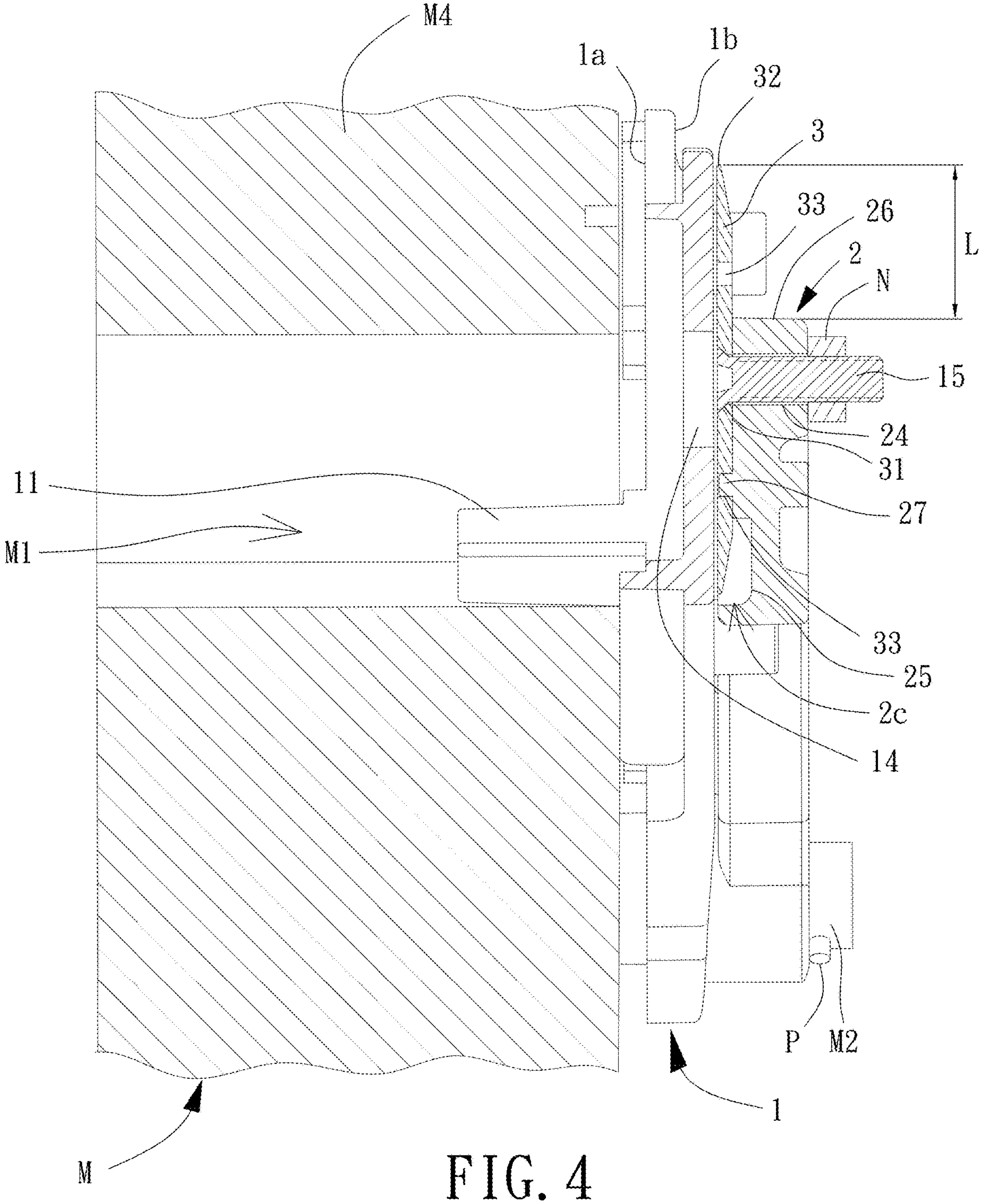
FIG. 4 is a sectional view taken along line 4-4 in FIG. 3.

Referring to FIGS. 1, 3, and 4, the blade 3 is aligned with and can be partially accommodated in the accommodation region 2*c* of the operation member 2. The blade 3 has a central hole 31 configured for the bolt 15 to insert through and engage with a nut N, securing the blade 3 to the operation member 2. The blade 3 can be disc-shaped with its cutting edge 32 around the periphery of the disc. The cutting edge 32 partially protrudes from the notch 26 of the operation member 2 (i.e., partially protrudes from the accommodation region 2*c*) by a protruding distance L (a straight-line distance through the center of the blade 3). The blade 3 has multiple positioning holes 33 arranged in a circle around the central hole 31, with each positioning hole 33 having an equal radius from the center of the central hole 31. One of the positioning holes 33 can accommodate the post 27, positioning the blade 3 in the accommodation region 2*c* of the operation member 2.

Referring to FIGS. 1 and 2, preferably, the roller shade cutter of the present application may further include an extending rod 4. One end of the extending rod 4 can be a handle, and the other end can be coupled to the second end 2*b* of the operation member 2, providing a longer lever arm for the operation member 2. By adjusting the angle of the extending rod 4 relative to the operation member 2, operators can more conveniently operate the roller shade cutter. In this embodiment, the second end 2*b* of the operation member 2 has a screw hole 28 configured for a screw B2, which can be a wing screw, to engage with. One end of the extending rod 4 has a through hole 41 configured for the screw B2 to engage with, allowing the extending rod 4 to be conveniently coupled to or detached from the second end 2*b* of the operation member 2. Preferably, the periphery of the screw hole 28 has a curved slot 29, and the periphery of the extending rod 4 has a bulge 42 extending into the curved slot 29. Thus, the extending rod 4 can rotate relative to the operation member 2 within a limited angle, allowing the extending rod 4 to adjust its angle relative to the operation member 2 for convenient operation.

Referring to FIGS. 2, 3, and 4, which show an example use of the roller shade cutter of the present application, a roller shade S is rolled into a cylindrical shape with a radius R. One end of the roller shade S is clamped and rotated by a clamp M3 of the machine M, with the other end protruding from an end face of a support seat M4 of the machine M, the protruding length depending on the actual cutting requirement. The base 1 is fitted on the shaft M2 of the machine M by the shaft tube 13 and prevented from detaching by a pin P. The location part 11 of the base 1 couples with the coupling part M1 of the machine M to position the base 1 relative to the machine M. The operator can adjust the angle of the extending rod 4 relative to the operation member 2 (as shown in FIG. 3) for convenient operation. At this point, the cutting edge 32 of the blade 3 partially protrudes from the notch 26 by a protruding distance L, which is greater than the radius R of the cylindrical roller shade S, and when the operation member 2 has not been pushed toward the roller shade S (as shown in FIG. 3), the cutting edge 32 is concealed within the base 1.

Figure 5:
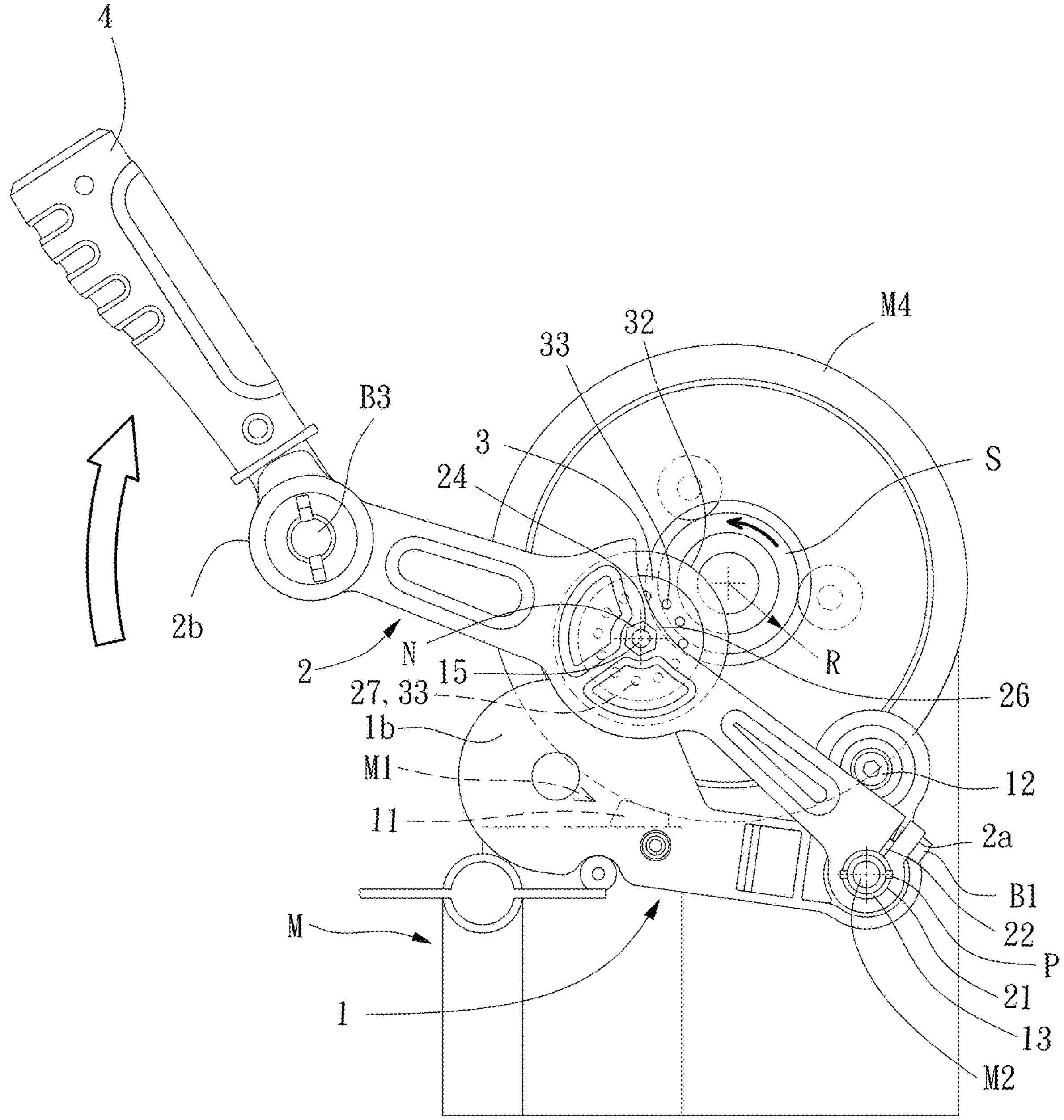
FIG. 5 is a view showing the use state of FIG. 3.

Referring to FIG. 5, when the operator pushes the extending rod 4 along with the operation member 2 in the direction indicated by the arrow, the operation member 2 pivots around the shaft tube 13, bringing the cutting edge 32 of the blade 3 closer to the roller shade S for cutting. When the upper surface of the operation member 2 abuts against the stopper 12, the operation member 2 is stopped by the stopper 12, and since the protruding distance L of the cutting edge 32 from the notch 26 is greater than the radius R of the roller shade S, this completes the cutting operation while preventing the operation member 2 from contacting and damaging the roller shade S.

Furthermore, in the roller shade cutter of the present application, since the cutting edge 32 of the blade 3 only partially protrudes from the notch 26, only the protruding portion of the cutting edge 32 cuts the roller shade S. When this portion becomes dull, the screw B1 at the first end 2*a* of the operation member 2 can be loosened to remove the operation member 2 from the shaft tube 13; alternatively, by removing the stopper 12 from the base 1, the second end 2*b* of the operation member 2 can be rotated away from the base 1 at a larger angle so that the blade 3 is not restricted by the base 1. The blade 3 can then be removed and rotated to position a sharp cutting edge 32 at the notch 26, and the blade 3 can be reassembled and fixed for continued use, greatly reducing the cost of the blade 3.

Figure 6:
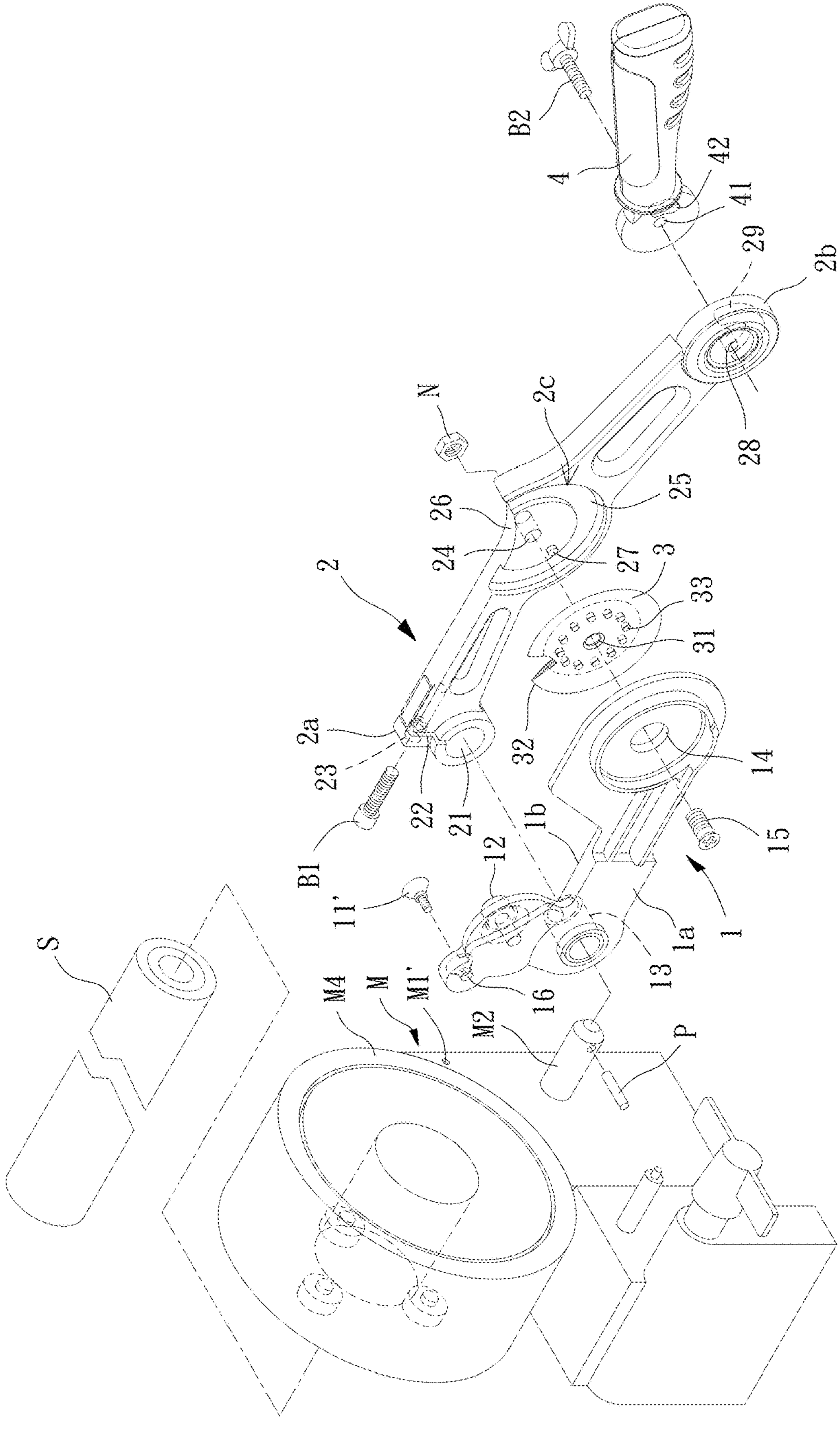
FIG. 6 is an exploded perspective view of a second embodiment of the present application.
Figure 7:
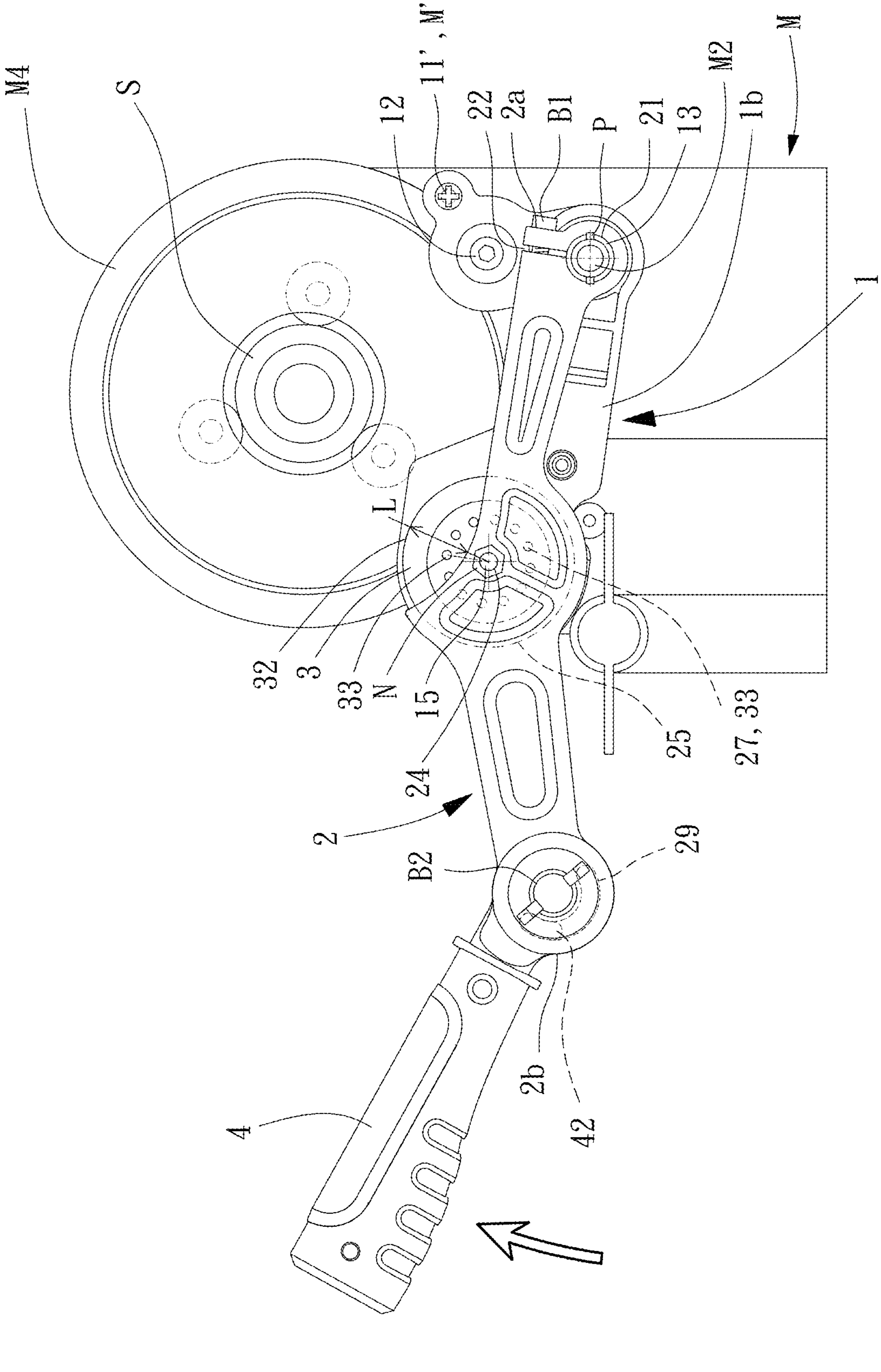
FIG. 7 is an assembled perspective view of the second embodiment of the present application.

Referring to FIG. 6, which shows a second embodiment of the roller shade cutter of the present application, compared to the first embodiment, in this embodiment, the location part 11' can be separated from the base 1, for example, it can be a screw. The coupling part M1' of the machine M can be a screw hole. The location part 11' can pass through a through hole in the base 1 to protrude from the first surface 1*a* of the base 1 and engage with the coupling part M1'. This also allows the base 1 to be positioned relative to the machine M, and the operator can similarly push the extending rod 4 along with the operation member 2 in the direction indicated by the arrow, causing the operation member 2 to pivot around the shaft tube 13, allowing the cutting edge 32 of the blade 3 to cut the roller shade S, while the upper surface of the operation member 2 can be stopped by the stopper 12, thus completing the cutting operation while preventing the operation member 2 from contacting and damaging the roller shade S.

In view of the forgoing, in the roller shade cutter of the present application, since the base has the stopper protruding from the second surface, when the upper surface of the operation member abuts against the stopper, it prevents the operation member from advancing further, thereby avoiding contact with and damage to the roller shade. When the cutting edge becomes dull, the blade can be removed, adjusted, and reassembled for continued use, reducing the blade cost. Furthermore, the extending rod provides a longer lever arm and allows adjustment of its angle relative to the operation member, making it more convenient for operators to operate the roller shade cutter.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims. Furthermore, in a case that several of the above embodiments can be combined, the present invention includes the implementation of any combination.

What is claimed is:

1. A roller shade cutter, comprising:

a base, having a first surface and a second surface opposite to the first surface, wherein the base further has a location part, wherein the second surface has a stopper protruding from the second surface, wherein the base has a shaft tube and a through hole penetrating through the first surface and the second surface, wherein the shaft tube and the through hole are spaced apart by a distance, and wherein the through hole is configured for a bolt to pass through;

an operation member, having a first end and a second end opposite to the first end, wherein the first end has a shaft hole for being pivotally fitted on the shaft tube, wherein an accommodation region is provided between the first end and the second end, wherein an assembly hole is located in the accommodation region, wherein the assembly hole is configured for the bolt to insert through, wherein the accommodation region further has a recess, wherein the recess surrounds the assembly hole and facing the second surface of the base, and wherein the accommodation region has a notch; and a blade, partially accommodated in the accommodation region, wherein the blade has a central hole, wherein the central hole is configured for the bolt to insert through and engage with a nut, wherein a periphery of the blade has a cutting edge, and wherein the cutting edge partially protrudes from the notch by a protruding distance.

2. The roller shade cutter as claimed in claim 1, wherein the location part is configured to couple with a coupling part of a machine to position the base relative to the machine.

3. The roller shade cutter as claimed in claim 1, wherein the shaft tube is fitted on a shaft of a machine, and the base is prevented from detaching by a pin.

4. The roller shade cutter as claimed in claim 1, wherein the shaft hole has an opening slot communicating with the shaft hole, wherein an end face of the first end has a counterbore communicating with the opening slot, wherein a bottom of the counterbore has an inner thread, and wherein a screw engages with the inner thread to adjust a gap of the opening slot.

5. The roller shade cutter as claimed in claim 1, wherein the recess has a post protruding from a surface of the recess, wherein the blade has a plurality of positioning holes arranged in a circle around the central hole, wherein each of the positioning holes has an equal radius from a center of the central hole, and wherein one of the positioning holes is configured for the post to extend into.

6. The roller shade cutter as claimed in claim 1, wherein the roller shade cutter further comprises an extending rod, wherein one end of the extending rod is a handle, and wherein another end of the extending rod is coupled to the second end of the operation member.

7. The roller shade cutter as claimed in claim 6, wherein the second end of the operation member has a screw hole configured for a screw to engage with.

8. The roller shade cutter as claimed in claim 6, wherein a periphery of the screw hole has a curved slot, and wherein a periphery of the extending rod has a bulge extending into the curved slot.

* * * * *